(12) United States Patent
Lepoutre

(10) Patent No.: US 6,186,183 B1
(45) Date of Patent: Feb. 13, 2001

(54) PIPE FOR CARRYING GASEOUS FLUID, MORE PARTICULARLY IN MOTOR VEHICLES, AND METHOD OF PRODUCING THE SAME

(75) Inventor: Henri Lepoutre, Roubaix (FR)

(73) Assignee: Westaflex-Automobile (FR)

( * ) Notice: Under 35 U.S.C. 154(b), the term of this patent shall be extended for 0 days.

(21) Appl. No.: 09/246,905

(22) Filed: Feb. 9, 1999

(30) Foreign Application Priority Data

Feb. 17, 1998 (FR) .................................................. 98 01883

(51) Int. Cl.⁷ ........................................................ F16L 11/12
(52) U.S. Cl. ........................... 138/125; 138/129; 138/133; 138/122
(58) Field of Search ....................... 138/153, 154, 138/150, 129, 124, 125, 122, 133

(56) References Cited

U.S. PATENT DOCUMENTS

| | | | |
|---|---|---|---|
| 3,739,815 | 6/1973 | Rejeski | 138/122 |
| 4,196,755 * | 4/1980 | Kutnyak et al. | 138/150 |
| 5,046,531 * | 9/1991 | Kanao | 138/150 X |
| 5,400,602 * | 3/1995 | Chang et al. | 62/50.7 |
| 5,551,484 * | 9/1996 | Charboneau | 138/104 |

FOREIGN PATENT DOCUMENTS

| | | | |
|---|---|---|---|
| 0 643 248 A1 | 3/1995 | (EP) | F16L/9/16 |
| 2 720 471 | 12/1995 | (FR) | F16L/11/02 |
| 1054392 | 1/1967 | (GB) . | |

* cited by examiner

*Primary Examiner*—Patrick Brinson
(74) *Attorney, Agent, or Firm*—Renner, Kenner, Greive, Bobak, Taylor & Weber

(57) ABSTRACT

A pipe for carrying gaseous fluid, more particularly in motor vehicles, and particularly for the admission of air for combustion to the engine or for ventilation of the vehicle interior, including an outer layer (1) of a fluid-tight flexible material and a non-woven fibrous inner layer (2) secured to the outer layer (1).

20 Claims, 1 Drawing Sheet

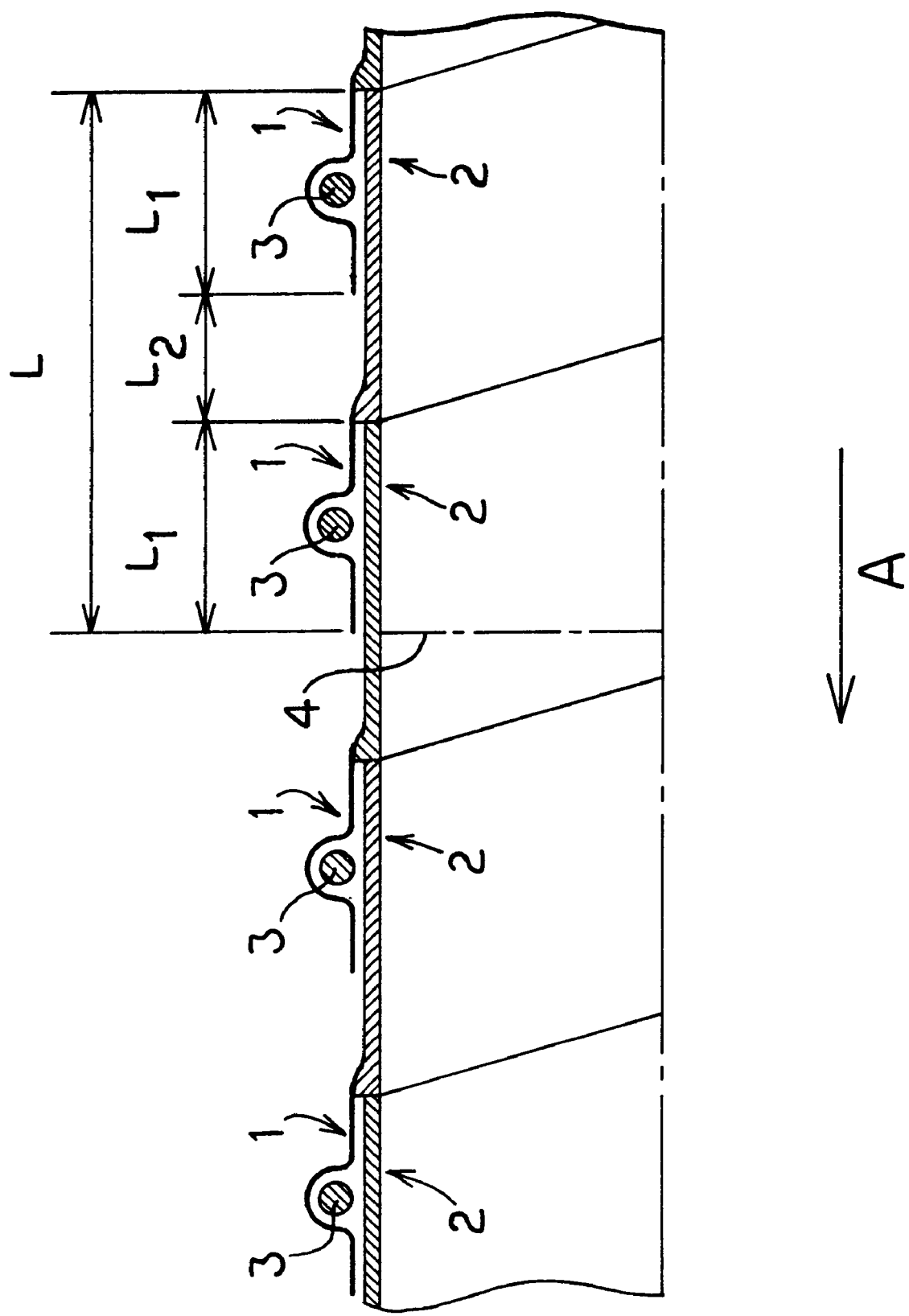

PIPE FOR CARRYING GASEOUS FLUID, MORE PARTICULARLY IN MOTOR VEHICLES, AND METHOD OF PRODUCING THE SAME

TECHNICAL FIELD

The invention relates to pipes used to carry gaseous fluids.

It applies particularly, but not exclusively, to pipes of this kind which are used in motor vehicles for carrying air, and more particularly for the admission of air for combustion to the engine or for ventilation of the vehicle interior.

The object of the invention is to provide a pipe of this type of simple and uncomplicated design and easily installed as a result of its flexibility characteristics both axially and in respect of flexure.

DISCLOSURE OF THE INVENTION

To this end, the pipe according to the invention is characterized in that it comprises an outer layer of a fluid-tight flexible material and an inner non-woven fibrous layer secured to the outer layer.

The outer layer provides sealing of the pipe while the inner fibrous layer forms a kind of framework for the pipe and, to some extent, actively participates in noise attenuation.

For example, the inner layer can be glued or welded by partial melting under pressure to the outer layer.

The outer layer, for example, consists of a thin flexible film, of a thickness for example of about 60 microns, and this layer can be of polyolefin, more particularly polyethylene.

With regard to the inner layer, this is advantageously of the polyester type, and in one exemplified embodiment comprises about 20% by weight of copolyester fibers having a melting point of about 140° C., the remainder being polyester fibers having a melting point of about 180° C.

Advantageously, the two layers extend over the same width and are wound helically with partial overlapping of the successive turns.

Preferably, and in manner known per se, a helical reinforcing thread, for example of metal or plastic, more particularly again of polyester, can be interposed between the overlapping turn parts.

This reinforcing thread is preferably in direct contact with the outer surface of the outer layer of a turn and the inner surface of the inner layer of the next turn, in the case in which the two layers are superposed over their entire common width. In a variant, this inner layer can be situated either on either side of the reinforcing thread or only on one side of this thread. In the latter case, the inner layer may be present only on the part of a turn which does not overlap the previous turn.

The invention also relates to a method of producing this pipe, said method being characterized in that it comprises making the inner fibrous layer at least partially of thermofusible fibers, heating the pipe to at least partially melt said thermofusible fibers, and subjecting the pipe to deformation into its final shape, the latter being maintained by the thermofusible fibers which, as they cool, bond by welding to one another and to the other fibers to produce a framework.

Advantageously prior to its heating and its deformation the pipe is produced by helically winding a composite strip with partial overlapping of the turns, the overlapping turn parts being secured to one another, more particularly by gluing or by partial melting under pressure.

According to one embodiment, the composite strip is produced by connecting two elementary strips, prior to the helical winding, said elementary strips being formed by the said outer and inner layers, the connection being made by gluing or by partial melting under pressure. Preferably, the said two superposed layers have the same width.

BRIEF DESCRIPTION OF THE DRAWING

The invention will be more readily understood from the following description with reference to the accompanying drawing which forms part of the description and the single FIGURE of which is an axial section showing part of a pipe made according to one embodiment of the invention.

PREFERRED EMBODIMENT FOR CARRYING OUT THE INVENTION

The drawing shows a pipe intended for use in the above-mentioned preferred application and comprises an outer layer 1 made of a fluid-tight flexible material, and an inner non-woven fibrous layer 2 secured to the outer layer 1.

The outer layer 1 consists, for example, of a thin flexible polyolefin film, more particularly polyethylene, of a thickness preferably of about 60microns.

With regard to the inner layer 2, this is of the polyester type and may contain about 20% by weight of copolyester fibers having a melting point of about 140° C., the remainder being polyester fibers having a melting point of about 180° C.

The pipe is preferably produced by helically winding two strips, preferably of the same width, respectively formed by the outer layer 1 and the inner layer 2, with partial overlapping of the turns, as shown in the drawing.

Preferably, winding is carried out from a composite strip which, prior to winding, is formed by connecting the two layers, securing them by gluing or by partial melting under pressure. These two layers are therefore connected and superposed over their common width.

This composite strip after helical winding has an axial width L of a few centimeters, which breaks down into a first part of width $L_1$ in which, as from its front edge, a given turn overlaps the rear marginal part of the preceding turn, a second part of width $L_2$ in which there is no overlapping of the turns, and a third part of width $L_1$, in which said given turn is overlapped by the next turn as considered in the direction of winding.

As indicated previously, the two layers 1 and 2 are superposed over their common width but, in the simplified embodiment illustrated, the inner layer 2 extends only over a part of the width of the strip, from the rear edge thereof, said width fraction corresponding to that part of the strip which does not overlap the preceding turn; in other words, the layer 2 extends only from a distance $L_1$ from the front edge of the strip when the latter is helically wound, to extend to the rear edge.

In this arrangement, the turns formed by the inner layer 2 are contiguous while the turns formed by the outer layer 1 are partially overlapping.

In both cases, connection of the successive turns in their overlap zone can be effected by gluing or, preferably, by partial melting under pressure.

In manner known per se it is advantageous to interpose between the overlapping turn parts a helical reinforcing thread 3, for example of metal or plastic, more particularly polyester. This reinforcing thread is situated, for example, at the center of the overlap zone of two successive turns.

In the case in which the two layers 1 and 2 are superposed over their common width, the reinforcing thread 3 is therefore situated between the outer surface of the outer layer of a turn and the inner surface of the inner layer of the next turn, as considered in the direction of formation of the helix.

However, the inner layer 2 may not be present in the zone of this reinforcing thread 3, either because it is situated only on either side of said thread or because, as shown in the drawing, it is present only in the zone in which a turn does not overlap the preceding turn.

According to one advantageous feature of the invention, the thermofusible properties of at least some of the fibers of the inner layer 2 are utilized to give the pipe, after its initial production, a different final shape, i.e. of a non-constant section. According to this feature, the pipe is heated to at least partially melt the thermofusible fibers, the pipe is subjected to deformation with force to achieve the final shape, and the pipe is left to cool or is cooled, the final shape being retained, this shape being maintained by the thermofusible fibers which, as they cool, bond by welding to one another and to the other fibers so as to produce a framework.

One other advantageous feature of the invention resides in the fact that during the formation of the pipe by helical winding on a mandrel as shown at 4, the pipe easily slides thereon in the removal direction A as a result of the low coefficient of friction of the fibrous inner layer.

Of course the invention is not limited to the examples described above; on the contrary, a number of variants could be devised without departing from the scope of the invention.

What is claimed is:

1. A pipe for carrying gaseous fluid, which comprises an outer layer of a fluid-tight flexible material and an inner layer, the two layers being secured together on a common width.

2. The pipe as defined in claim 1, wherein the inner layer is a fibrous non-woven layer.

3. The pipe as defined in claim 1, wherein the inner layer is welded by partial melting under pressure to the outer layer.

4. The pipe as defined in claim 1, wherein the outer layer comprises a thin flexible film of a thickness lower than about 60 microns.

5. The pipe as defined in claim 1, wherein the outer layer is a polyolefin.

6. The pipe as defined in claim 1, wherein the inner layer is of the polyester type.

7. The pipe as defined in claim 6, wherein the inner layer comprises approximately 20% by weight of copolyester fibers having a melting point of about 140° C., the remainder being polyester fibers having a melting point of about 180° C.

8. The pipe as defined in claim 1, wherein the two layers have a common width and are superimposed over their common width.

9. The pipe as defined in claim 1, wherein the two layers are helically wound in successive turns with partial overlapping of the successive turns.

10. The pipe as defined in claim 9, wherein a helical reinforcing thread is interposed between overlapping turn parts.

11. The pipe as defined in claim 10, wherein the reinforcing thread is in direct contact with the outer surface of the outer layer of a turn and the inner surface of the outer layer of the next turn.

12. The pipe as defined in claim 10, wherein the inner layer is situated only on one side of the reinforced thread.

13. The pipe as defined in claim 9, wherein the inner layer is present only on that part of a turn which does not overlap the previous turn.

14. A pipe for carrying gaseous fluid, which comprises an outer layer of a fluid-tight flexible material and an inner non-woven fibrous layer secured to the outer layer, wherein the outer layer comprises a thin flexible film of a thickness lower than about 60 microns.

15. A pipe for carrying gaseous fluid, which comprises an outer layer of a fluid-tight flexible material and an inner-woven fibrous layer secured to the outer layer, wherein the inner layer is of the polyester type and comprises approximately 20% by weight of copolyester fibers having a melting point of about 140° C., the remainder being polyester fibers having a melting point of about 180° C.

16. A pipe for carrying gaseous fluid, which comprises an outer layer of a fluid-tight flexible material and an inner-woven fibrous layer secured to the outer layer, wherein the two layers are helically wound in successive turns with partial overlapping of the successive turns.

17. The pipe as defined in claim 16, wherein a helical reinforcing thread is interposed between overlapping turn parts.

18. The pipe as defined in claim 17, wherein the reinforcing thread is in direct contact with the outer surface of the outer layer of a turn and the inner surface of the outer layer of the next turn.

19. The pipe as defined in claim 17, wherein the inner layer is situated only on one side of the reinforced thread.

20. The pipe as defined in claim 16, wherein the inner layer is present only on that part of a turn which does not overlap the previous turn.

* * * * *